United States Patent [19]

Botcherby et al.

[11] 4,123,166

[45] Oct. 31, 1978

[54] OPTICAL DETECTOR OF REMOTE MOVEMENT INCLUDING CYCLIC SCANNING OF TARGET

[75] Inventors: Stephen C. L. Botcherby, Dorking; Christopher P. Starbuck, London; Jeremy A. Fitzherbert, Shepparton, all of England

[73] Assignee: Decca Limited, London, England

[21] Appl. No.: 608,197

[22] Filed: Aug. 26, 1975

[30] Foreign Application Priority Data

Sep. 3, 1974 [GB] United Kingdom ............... 38501/74

[51] Int. Cl.$^2$ ...................... G01B 11/26; G01N 29/00
[52] U.S. Cl. ..................................... 356/152; 73/657; 350/269; 350/603; 356/28
[58] Field of Search ............... 350/6, 269; 356/5, 152, 356/28; 250/199, 203 R; 73/627, 655, 657

[56] References Cited

U.S. PATENT DOCUMENTS

| | | | |
|---|---|---|---|
| 2,911,470 | 11/1959 | Greenleaf et al. | 350/6 |
| 3,409,369 | 11/1968 | Bickel | 356/28 |
| 3,435,656 | 4/1969 | Jordan et al. | 73/657 |
| 3,476,483 | 11/1969 | Weeks | 73/655 |
| 3,482,436 | 12/1969 | Neish et al. | 73/657 |
| 3,544,221 | 12/1970 | Putnam | 350/6 |
| 3,563,664 | 2/1971 | Campbell et al. | 356/106 |
| 3,644,043 | 2/1972 | Jones et al. | 356/5 |
| 3,731,103 | 5/1973 | O'Meara | 356/5 |
| 3,733,129 | 5/1973 | Bridges | 356/5 |

*Primary Examiner*—S. C. Buczinski
*Attorney, Agent, or Firm*—Cushman, Darby & Cushman

[57] ABSTRACT

A detector of remote movement in which light from a laser is directed at a target and, on reflection from the target, is mixed with reference light from the laser to produce a Doppler signal denoting the movement of the target. The beam of light from the laser is directed through an optical system which brings the light to a focus and thereafter projects the light from the focus at the target. The optical system includes a lens which is mounted in a ferromagnetic carrier which can be vibrated in two orthogonal directions each normal to the axis of the light beam and the axis of the lens. Coils disposed to produce these orthogonal movements are energized in quadrature so as to produce conical scanning of the beam of light on the target. Signals which denote the modulation of the amplitude of the Doppler signal produced by the conical scanning are compared with the driving signals for the coils processed to produce bias signals which are used to bias the mean direction of the beam in a sense to increase the amplitude of the Doppler signal and thereby to control the beam automatically to seek a point on the target which produces a maximum amplitude in the derived Doppler signal.

6 Claims, 1 Drawing Figure

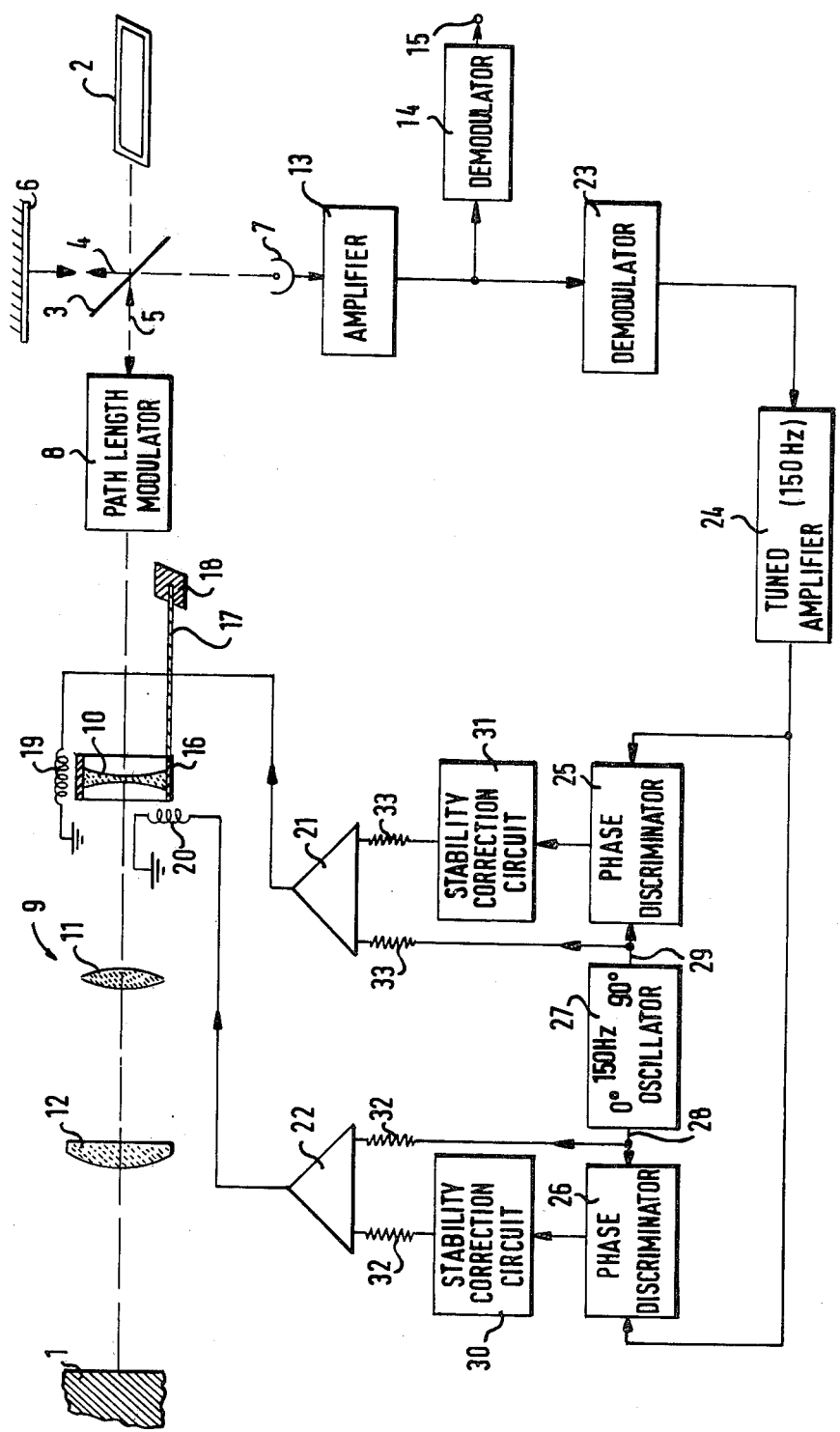

OPTICAL DETECTOR OF REMOTE MOVEMENT INCLUDING CYCLIC SCANNING OF TARGET

BACKGROUND OF THE INVENTION

This invention relates to detectors of remote movement and particularly a vibration detector in which a coherent light beam from, for example, a laser is directed at a remote target and light which is reflected from the target is mixed with reference light that is not so reflected to obtain a Doppler signal which represents the movement of the target. Such a detector of remote movement is particularly useful in the detection of movement of structural components of large bridges or other objects in locations which are not readily accessible for local measurement of their movement.

A serious problem which is encountered in the use of such a vibration detector is an undesirably large variation in the amplitude of the Doppler signal. This variation can be caused by local variations in reflectivity of the object or structure at which the beam of light from the laser is directed. The reflectivity may be inherent in the composition of the object or may be affected by atmospheric conditions. The variation can be so great as to cause the complete loss of the Doppler signal at times and if, as is often required, the Doppler signal is used to reproduce the waveform of vibration of the object the loss of signal seriously affects the accuracy of the measurement made by the detector.

SUMMARY OF THE INVENTION

It is accordingly the principal object of the invention to provide an improved detector of remote movement. It is a further object of the invention to provide a convenient means of scanning a target with a light beam in a manner such as will maximise the amplitude of the returned Doppler signal.

In a preferred form of the invention, the light beam is passed through an optical system which is controlled to produce cyclic variation in the direction of the projected light beam to move the point of impingement of the light beam over the surface of the target. The cyclic variation may be a side-to-side movement but is preferably in the form of conical scanning. The system preferably includes an automatic control which principally comprises a phase detector which responds to the phase relationship between the variation in the direction of the projected light beam and a consequent modulation of the amplitude of the Doppler signal to produce a bias signal which is used to bias the mean direction of the beam in a sense which increases the amplitude of the derived Doppler signal.

In a particular form of the invention, the cyclic variation in the direction of the beam is produced by two orthogonal coils which influence a lens which is mounted for transverse movement across the path of the light beam. The coils are fed with quadrature driving signals which are separately compared with a respective signal component obtained by demodulating the derived Doppler signal to recover the modulation components at the frequency of the driving signal. The phase comparison produces a signal which is used to bias the driving signal to the respective coil.

Other objects and features of the present invention will be readily apparent from a consideration of the following description with reference to the accompanying drawing.

BRIEF DESCRIPTION OF THE ACCOMPANYING DRAWING

The single FIGURE illustrates schematically a vibration detector constructed in accordance with the invention.

DESCRIPTION OF THE PREFERRED EMBODIMENT

The preferred embodiment illustrated in the drawing is arranged to detect the movement of a target 1. This target would normally be remote from the detector and may be vibrating, in which case it would normally be desirable to reproduce a wave form denoting the vibration of the target. A laser 2 is used as a convenient source for a coherent light beam which is directed at a beam-splitter 3. The beam-splitter, which may be a polarisation beam-splitter, splits the beam of light from the laser into two components 4 and 5. The component 4 is directed at a reflector in the form of a static mirror 6 whence the beam is reflected back through the beam-splitter to a photodetector 7. The component 5 is directed at the target 1 by way of, in this particular embodiment, a path-length modulator 8 and an optical system 9 which directs a narrow beam of light towards the target 1. Light that is reflected back from the target 1 through the optical system 9 to the beam-splitter 13 is diverted to the photodetector 7.

The arrangement as thus far broadly described constitutes an arrangement by means of which a Doppler signal, of which the instantaneous frequency denotes the instantaneous velocity of the target 1 relative to the source of light (the laser), can be obtained. The Doppler signal is obtained by the mixing of the reference light constituted by the component 4 and the light which is reflected back from the target 1.

The path-length modulator 8, which may take the form described in the co-pending application filed in names Botcherby and Starbuck of even date entitled "Optical Path-Length Modulators", introduces into the component 5 a phase modulation in order to offset the frequency of one component of the light from the laser by a frequency which is usually greater than the highest expected Doppler frequency in the absence of such phase modulation. Accordingly the Doppler frequency which is obtained in the output of the photodetector 7 will vary, assuming variation of the velocity of the target 1 about zero, about a non-zero frequency corresponding to the frequency by which the Doppler frequency is offset. This offsetting provides a means of providing different Doppler frequencies for movement of the object towards the source and movement of the object away from the source. The Doppler signal is amplified by an amplifier 13 and demodulated by a demodulator 14, which may comprise a frequency discriminator having a centre frequency corresponding to the offset frequency, so as to provide at an output terminal 15 a signal of which the amplitude varies in accordance with the variation of the velocity of the target 1.

If the detector is only intended to detect the rate of movement of the target 1, the path-length modulator 8 could be omitted. Moreover, the location of the path-length modulator in the path of the component 5 is not essential. For example, it may be located between the beam-splitter 3 and the reference mirror 6 or, depending on its particular form, take the place of the mirror 6. The path-length modulator may comprise in such a case a mirror which can be vibrated at an ultrasonic frequency by a piezo-electric driver. The particular form of the path-length modulator is not important to the present invention.

The signal which is received from the target can be subject to very great variations in amplitude by virtue of the necessarily irregular nature of the surface on which the beam of light from the laser impinges. The variation may be due to a random diffraction pattern associated with the surface. Slight variation in the direction of the beam-relative to the target or the point of impingement of the beam on the target may produce variation in the amplitude of the light reflected back from the target and accordingly in the amplitude of the Doppler signal which is obtained at the output of the photodetector 7.

The rest of the features of the embodiment facilitate automatic tracking of a point, on the target, which locally yields a maximum return signal.

In this embodiment the optical system 9 is constituted by a telescope comprising a concave lens 10, an intermediate convex lens 11, and an objective, plano-convex lens 12. The arrangement of these lenses is such that movement of the concave lens 10 in a plane normal to the axis of the telescope 9, that is to say in a plane at right angles to the paper and oriented in a plane which is vertical in the drawing, will shift the effective focus of the lens 11 and will accordingly move the direction of the beam. The particular form of the telescope is not essential; for example, an arrangement employing two convex lenses of which one replaced the concave lens 10 and the other was constituted by a lens such as the lens 12 is also possible.

The lens 10 is mounted within a short ferromagnetic cylinder 16 which is carried on a light arm 17 in the form of a cantilever extending in a direction parallel to the axis of the telescope and mounted at its end remote from the cylinder 16 in a support 18. This arrangement provides a mounting which allows the lens 10 to vibrate without excessive damping in the aforementioned plane under the influence of an orthogonal pair of coils 19 and 20. These coils are diagramatically illustrated. They are physically arranged to produce movement of the cylinder 16 and accordingly the lens 10 in orthogonal directions, for example into the plane of the paper and vertically with respect to the drawing. The coils are fed with cyclically varying electric current from respective power amplifiers 12 and 22 at a frequency of, for example, 150 Hz.

The signals fed to the coils 19 and 20 are preferably, as in the present embodiment, in quadrature. The light beam is accordingly moved in a conical scan. For each of the two directions of movement of the lens 10, and accordingly of the projected beam, the Doppler signal which is obtained in the output of the photodetector 7 carries a component of amplitude modulations. It is convenient to consider one direction of movement alone. If the amplitude of the returned signal increases as the beam moves in a direction corresponding to an increase in the instantaneous value of the driving signal the respective component of the modulation of the amplitude of the Doppler signal will be in phase with the driving signal; if the said amplitude decreases as the instantaneous value increases then the respective component of the modulation of the Doppler signal will be in anti-phase with the driving signal. This phenomenon may be used to produce an error signal which biases the driving signal applied to the respective coil 19 or 20 to tend to center the beam on a point, on the target, which provides, at least locally, a maximum return signal. A phase-sensitive detector of known form may be used to provide such an error signal.

Scanning movement of the projected light to and fro in one direction only would be possible if desired. Moreover, the mean position of the projected light beam could be adjusted, in response to the error signal or error signals by means other than the coils 19 and 20, but the scheme adopted in the preferred embodiment is convenient.

The Doppler signal obtained at the output of the amplifier 13 is fed to a demodulator 23 which recovers the signal describing the variation of the amplitude of the Doppler signal at the frequency of vibration determined by the driving signals applied to the coils 19 and 20. The output of the demodulator 23 is amplified by a tuned amplifier 24 to remove harmonics of the scanning frequency and other unwanted signals and then fed to one input of each of the two phase-sensitive detectors 25 and 26. To the other inputs of these two phase-sensitive detectors is fed a respective one of two outputs from an oscillator 27 of which the two outputs appearing on lines 28 and 29 are displaced in phase by 90°. The output of each of the phase-sensitive detectors is a direct current signal which is positive or negative according as the respective input signals are in-phase or in anti-phase respectively. The output is, in any case, an error signal which can be used to bias the projected beam towards a position which yields a maximum return signal. The two direct current signals are fed through respective stability correction circuits 30 and 31; these circuits comprise resistance and capacitance which can be selected in accordance with known principles of servomechanical control systems. The amplifiers 21 and 22 receive through appropriate input resistors 32 and 33 the outputs of the oscillator 27 directly. Added to these two signals are the respective direct current error signals from the phase-sensitive detectors 25 and 26.

We claim:

1. A detector of remote movement, comprising:
    means for projecting a beam of coherent light at a target;
    means for mixing light reflected from the target with reference light to obtain a Doppler signal representing movement of the target;
    means for providing cyclic variation in the direction of the projected light beam to move the point of impingement thereof over the surface of the target;
    means responsive to a phase relationship between the variation in the direction of the projected light beam and modulation of the amplitude of the Doppler signal at the frequency of said variation to produce a bias signal; and
    means responsive to the bias signal for superimposing corresponding bias on said cyclic variation so as to shift the mean direction of the beam in a sense to increase the amplitude of the Doppler signal.

2. A detector according to claim 1, in which the means for providing cyclic variation comprises means for producing orthogonal variations in the direction of the projected light beam and in which said means responsive to the phase relationship of the said variation and the modulation of the amplitude of the Doppler signal comprises two phase discriminators each coupled to detect the phase relationship of the respective orthogonal variation and the corresponding modulation of the amplitude of the Doppler signal to provide a respective bias for the mean direction of the projected beam.

3. A detector of remote movement comprising;
- means for projecting a beam of coherent light at a target,
- means for mixing light reflected from the target with light that is not so reflected to obtain a Doppler signal representative of the movement of the target;
- means for producing two quadrature driving signals at a predetermined frequency;
- means for demodulating said Doppler signal to recover a component at said frequency;
- two phase discriminators, each connected for producing a bias signal denoting the phase relationship between a respective component of said demodulated signal and a respective one of said quadrature signals of corresponding frequency;
- means for combining the bias signals each with a respective one of said quadrature driving signals; and
- means responsive to said driving signals for producing corresponding transverse shifts in the direction of said beam.

4. A detector according to claim 3, wherein said means for producing said transverse shifts comprises;
- orthogonal coils each coupled for receiving the respective driving signal;
- a lens having its axis substantially coincident with the axis of said beam;
- a ferro-magnetic carrier for said lens;
- a cantilever having one end mounted in a support and another free end which carries said carrier.

5. A detector of remote movement comprising;
- a source of a coherent light beam;
- an optical system for projecting said beam at a remote target,
- the optical system including a lens disposed with its axis parallel to the beam and a lens mounting permitting orthogonal transverse vibratory movements of the lens across said axis whereby the beam can scan the target;
- means for mixing light received from the target through said optical system with reference light to produce a Doppler signal denoting movement of the target;
- means for producing said vibratory movement of said lens in response to a driving signal;
- means for generating a quadrative low-frequency driving signal at a predetermined frequency;
- means for demodulating said Doppler signal to recover quadrative signal components denoting modulation of the amplitude of said Doppler signal at said predetermined frequency; means for comparing the phase of each said driving signal with a respective one of said signal components to produce a respective bias signal; and
- means for adding said bias signals each to the respective driving signal.

6. A detector according to claim 5, further comprising an optical path-length modulator for applying high frequency modulation to said light beam; and
- means for demodulating the mixed light to recover the Doppler signal from the high frequency modulation thereof.

* * * * *